United States Patent [19]
Kwon

[11] Patent Number: 5,932,954
[45] Date of Patent: Aug. 3, 1999

[54] ELECTRON TUBE GROUNDING DEVICE OF IMAGE DISPLAY UNIT

[75] Inventor: Sung-Soo Kwon, Seoul, Rep. of Korea

[73] Assignee: SamSung Electronics Co., Ltd., Kyungki-do, Rep. of Korea

[21] Appl. No.: 08/850,068

[22] Filed: May 2, 1997

[30] Foreign Application Priority Data

May 2, 1996 [KR] Rep. of Korea ................... 96-10497

[51] Int. Cl.$^6$ .................................................. H01F 13/00
[52] U.S. Cl. ........................... 313/313; 439/92; 439/95; 174/51
[58] Field of Search ................. 439/92, 95; 174/51; 313/313

[56] References Cited

U.S. PATENT DOCUMENTS

| | | | |
|---|---|---|---|
| 3,992,897 | 11/1976 | Loos | 62/262 |
| 4,916,358 | 4/1990 | Bunton | 313/479 |
| 5,382,868 | 1/1995 | Fukaishi | 313/313 |
| 5,532,428 | 7/1996 | Radloff et al. | 174/35 GC |

Primary Examiner—Vip Patel
Assistant Examiner—Matthew J. Gerike
Attorney, Agent, or Firm—Robert E. Bushnell, Esq.

[57] ABSTRACT

In an electron tube grounding device, an image display unit includes an earth plate for grounding an electron tube, and a degauss coil for magnetic erasing, which is improved to prevent the deformation of the earth plate for grounding a chassis frame which shields the electron tube and its periphery. The damage of the degauss coil can be caused by the assembling of the electron tube and the chassis frame. The electron tube grounding device includes an electrontube, a chassis frame for surrounding the electron tube, and an earth plate for grounding the chassis frame and the electron tube. The chassis frame includes a penetration aperture formed on one side thereof, and a rail means protrudently formed on the back portion of and outside the penetration aperture where the earth plate is inserted to be fixed. The earth plate includes a fixed end portion fixed at one side of the chassis frame, an intermediate portion with elastic force which makes it contact with a band of the electron tube in case of assembling, and a free end portion inserted into the rail means after coming out of the chassis frame through the penetration aperture.

15 Claims, 5 Drawing Sheets

ELECTRON TUBE GROUNDING DEVICE OF IMAGE DISPLAY UNIT

This application makes reference to, incorporates the same herein, and claims all benefits accruing under 35 U.S.C. §119 from an application entitled Electron Tube Grounding Device of Image Display Unit earlier filed in the Korean Industrial Property Office on May 2, 1996, and there duly assigned Serial No. 96-10497 by that Office.

BACKGROUND OF THE INVENTION

1. Field of the Invention

The present invention relates to an image display unit including an earth plate for gounding an electron tube, and a degauss coil for magnetic erasing. More particularly, the present invention relates to an electron tube grounding device of an image display unit improved to prevent the deformation of the earth plate for grounding a chassis frame which shields the electron tube and its periphery, and to decrease the damage of the degauss coil caused during the assembly of the electron tube and the chassis frame.

2. Discussion of Related Art

Typically, a image display unit has an electron tube for producing an image, and a chassis frame located around the electron tube for shielding. High voltage current passes through the electron tube so that the chassis frame is employed to surround the outside of the electron tube in order to shield it. Inside the chassis frame, a degauss coil for magnetic erasing, and the earth plate for grounding are installed. The earth plate is deformed prior to assembling during treating and manufacturing process because the free end portion thereof is installed while not being fixed. This is so that the earth plate does not contact with a band of the electron tube during assembling with the electron tube. As a result, the grounding function is not fully performed, and thus, the electric field shielding function is not also performed, thereby deteriorating the quality of products. From my study of the contemporary practice and the art, I find that there is a need for an image display unit that solves such a problem, especially by improving the portions of the device used during assembly.

SUMMARY OF THE INVENTION

Accordingly, an object of the present invention is to provide an improved electron tube grounding device of an image display unit.

An object of the present invention is to provide an improved electron tube grounding device of electronic appliance preventing or decreasing the deformation of an earth plate for grounding a chassis frame which shields an electron tube and its periphery, by controlling the location of the earth plate, and preventing or decreasing the damage of a degauss coil caused by the assembling of the electron tube and the chassis frame.

Another object of the present invention is to provide an electron tube grounding device of electronic appliance to prevent or to decrease the deformation of an earth plate and the damage of a degauss coil, without widely changing the structure of a conventional grounding device, and to enhance its productivity.

To achieve these and other objects, as embodied and broadly described, the image display unit may include an electron tube, a chassis frame for surrounding the electron tube, and an earth plate for grounding the chassis frame and the electron tube. The chassis frame may include a penetration aperture formed on one side thereof, and a rail means protruding from the back portion beside the penetration aperture where the earth plate is inserted to be fixed. The earth plate may include a fixed end portion fixed at one side of the chassis frame, an intermediate portion with elastic force contacting with a band of the electron tube in case of assembling, and a free end portion inserted into the rail means by coming out of the chassis frame through the penetration aperture.

In the rail means of the chassis frame, a retainer having a guiding groove protrudes from the chassis frame outwardly. The guiding groove guides the free end portion of the earth plate passing through the penetration aperture. In addition, the retainer is formed integrally with the chassis frame by punching the chassis frame, and a deviation preventing piece is formed at a punched aperture.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
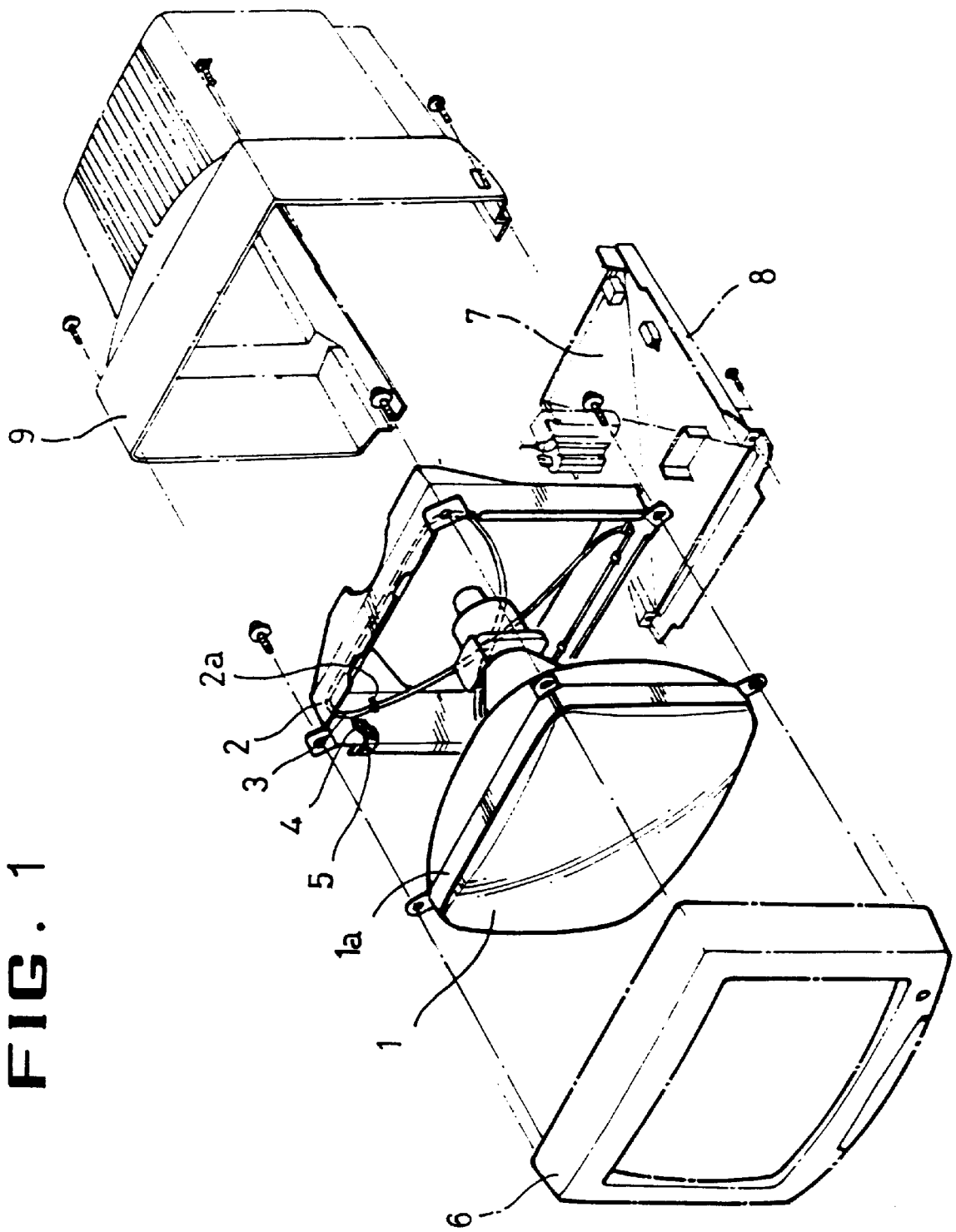
FIG. 1 illustrates an exploded perspective view of a grounding device of an image display unit according to a contemporary practice.
Figure 2:
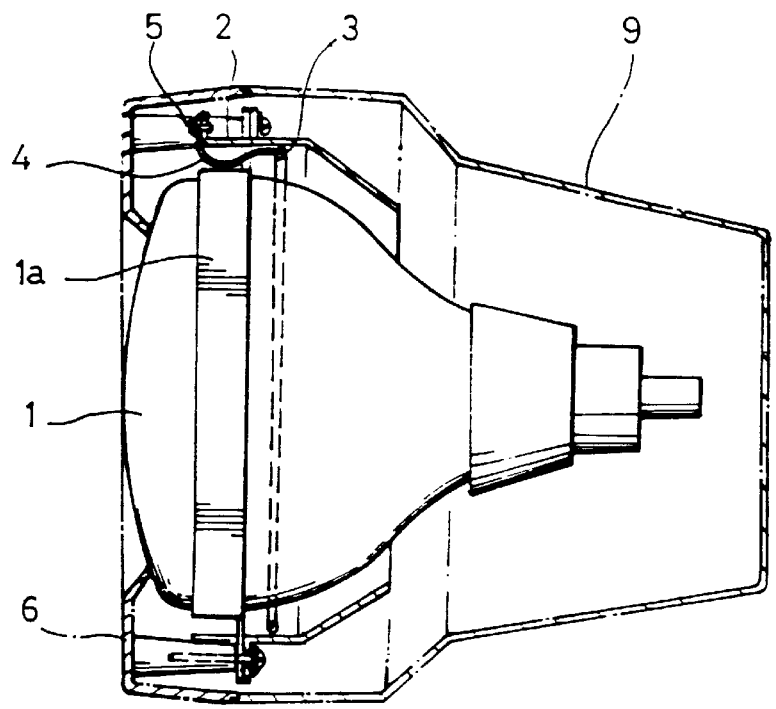
FIG. 2. is a plane-sectional view of the grounding device shown in FIG. 1.

FIGS. 1 and 2 show a display monitor of a preferred embodiment of the image display unit. High voltage current passes through the electron tube 1 so that the chassis frame 2 is employed to surround the outside of the electron tube 1 in order to shield it. The degauss coil 3 for magnetic erasing, and the earth plate 4 for grounding are installed inside the chassis frame 2.

When an electronic appliance needs to use the display monitor, the electron tube 1 and the chassis frame 2 are together fixed at a front case 6 which is a first cover. After a board frame 8 linked with a main circuit board 7 is installed at the bottom, a rear case 9 which is a second cover, is coupled. As shown in FIGS. 1 and 2, one end of the earth plate 4 is riveted on the front side of the chassis frame 2 with a rivet 5, and the other end of the earth plate 4 which is the free end portion thereof, is installed inside the chassis frame 2 while not being fixed so that the earth plate 4 is made to contact with a band 1a of the electron tube 1 in case of assembling with the electron tube 1.

Figure 3:
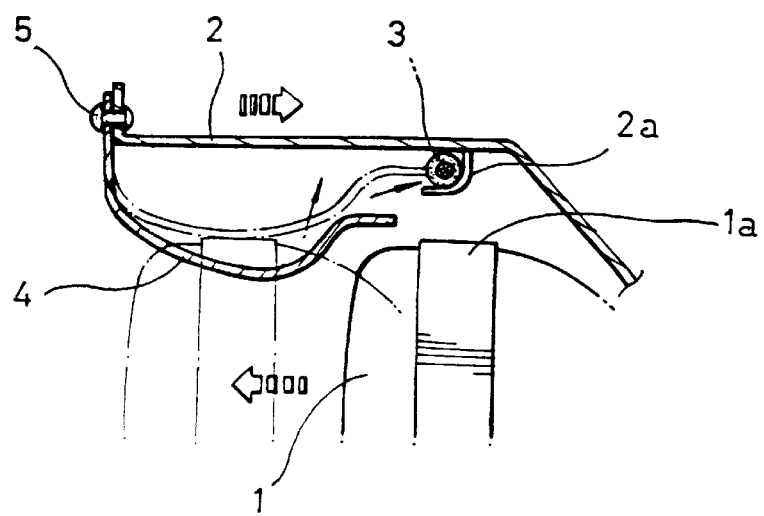
FIG. 3 is a magnified sectional view of a main portion of the grounding device of a contemporary practice.

As illustrated with a dotted line in FIG. 3, however, the earth plate 4 is deformed prior to assembling during treating and manufacturing process because the free end portion thereof is installed while not being fixed so that the earth plate 4 does not contact with the band 1a of the electron tube 1 in case of assembling with the electron tube 1. As a result, the grounding function is not fully performed, and thus, the electric field shielding function is not also performed, thereby deteriorating the quality of products. The degauss coil 3 is fixed by being inserted into a bent piece 2a formed inside the chassis frame 2 because the degauss coil 3 for magnetic erasing should be located at the back of the band 1a of the electron tube 1, and the earth plate 4 is fixed at the chassis frame 2 in front of the degauss coil 3 in order to contact with the band 1a of the electron tube 1. The earth plate 4 is located with the end of its free end portion adjacent to the degauss coil 3, and therefore, the earth plate 4 is pushed in case of assembling with the electron tube 1.

As a result, as illustrated with an imaginary line in FIG. 3, the sharp portion of the free end portion contacts with the degauss coil 3, and presses it so that the coating of the degauss coil is torn. Accordingly, the magnetic erasing function is not fully performed, thereby manufacturing poor quality of products. The decrease of productivity is also caused by poor grounding according to the deformation of the earth plate and poor assembling such as the damage of the degauss coil's coating.

According to FIGS. 4 to 7 of the preferred embodiments of the present invention, a chassis frame 20 includes a rivet hole 21 formed on one side of the front thereof, and a penetration aperture 22 formed on one side thereof where something is penetrated inside and outside. A retainer 23 is protrudently formed on the back of and outside the penetration aperture 22, and the retainer 23 is formed at both sides of the chassis frame 20. A guiding groove 23a which is open towards the penetration aperture 22, is formed by punching the chassis frame 20, and a deviation preventing piece 25 is formed at the center of a punched aperture 24.

An earth plate 40 includes a fixed end portion 42 having a coupling hole 41 which mates with the rivet hole 21 of the chassis frame 20, an intermediate portion 43 with elastic force which makes it contact with a band 11 of an electron tube 10 in case of assembling, and a free end portion 44 inserted into the penetration aperture 22 of the chassis frame 20. Multiple slits 45 are formed to make the intermediate bent portion 43 amicably bent. Locating holes 46 are formed on both sides of the rivet hole 21 at the fixed end portion 42 of the earth plate 40 where locating projections 26 formed at the chassis frame 20 are inserted, in case of fixing the earth plate 40 so that the rivet hole 21 of the chassis frame 20 easily and correctly fits with the coupling hole 41 of the earth plate 40, in case of fixing work, and that the earth plate 40 does not move upwardly/downwardly, after the fixing work.

Figure 5A:
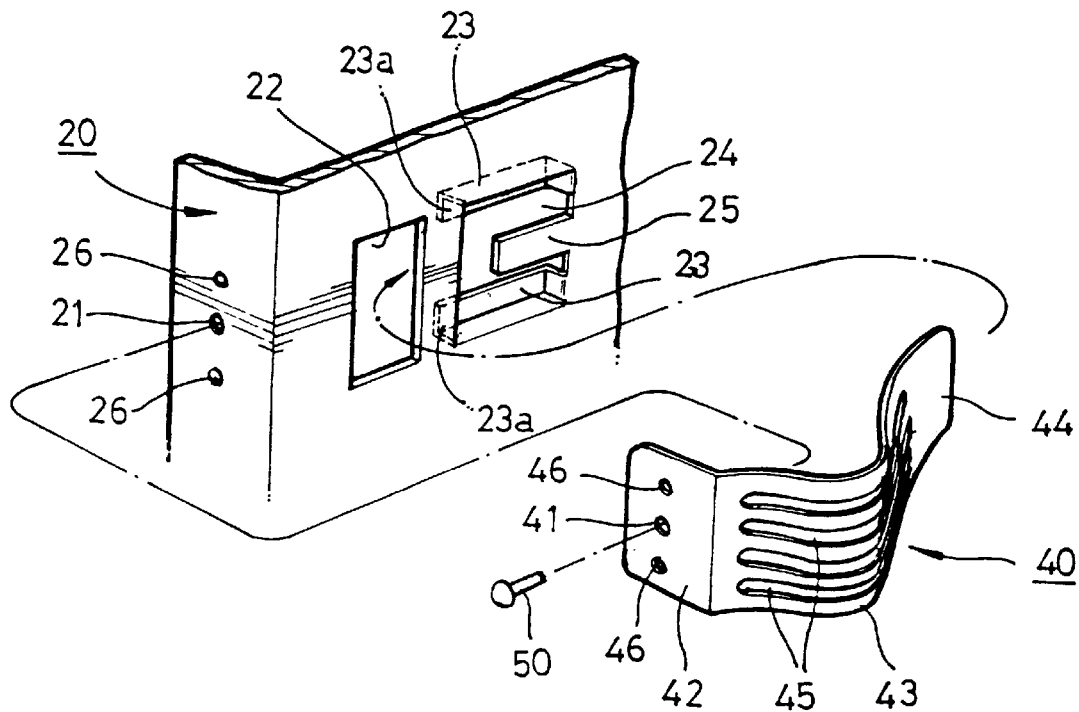
FIG. 5A is an exploded perspective view of the grounding device constructed according to principles of the present invention.
Figure 5B:
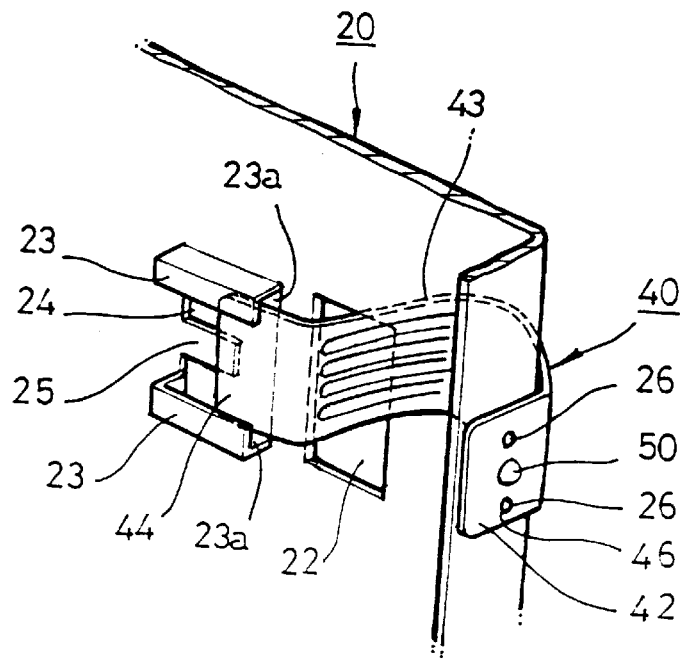
FIG. 5B is an assembled perspective view of a rear portion of the grounding device shown in FIG. 5A.
Figure 6:
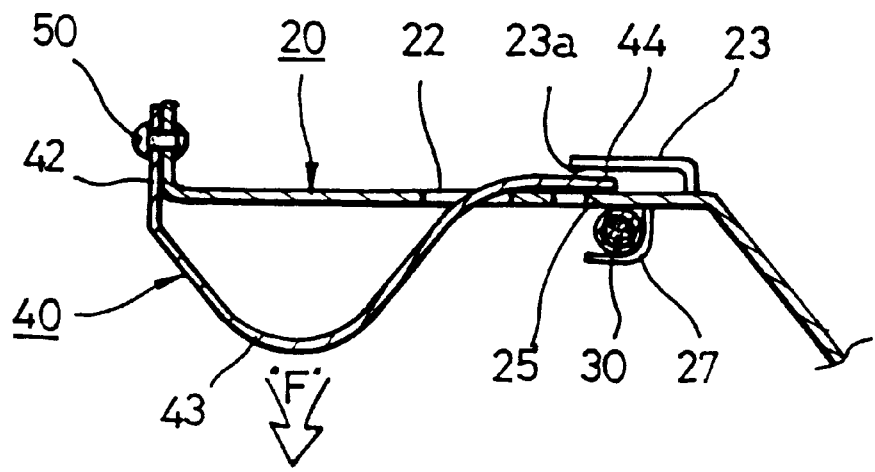
FIG. 6 is a plane-sectional view of the grounding device constructed according to the present invention.

As shown in FIGS. 5A and 5B, the chassis frame 20 and the earth plate 40 are coupled. The free end portion 44 of the earth plate 40 is first inserted into the penetration aperture 22 from the front surface of to the back surface of the chassis frame, and the free end portion 44 passed is fitted in the guiding groove 23a of the retainer 23. Next, the coupling hole 41 formed at the fixed end portion 42 of the earth plate 40 is fitted with the rivet hole 21 of the chassis frame 20, and a rivet 50 is inserted so that the fixed end portion 42 is fixed at the chassis frame 20. When the earth plate 40 is fixed in such a way, the intermediate bent portion 43 gets to protrude towards the inside of the chassis frame 20 so that an elasticity F towards the inside of the chassis frame 20 is imparted.

Figure 7:
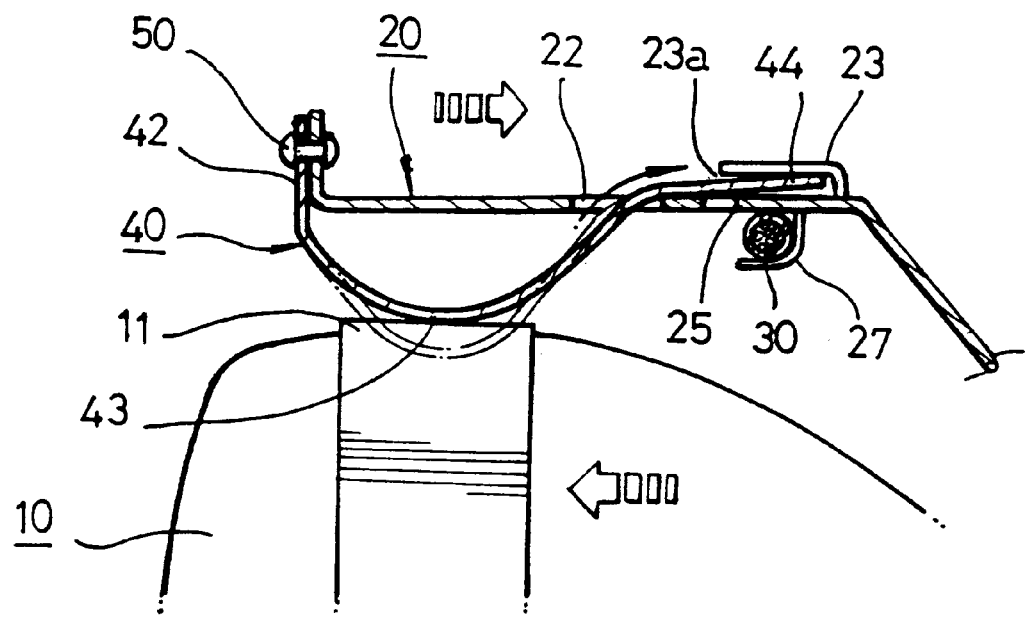
FIG. 7 is a plane-sectional view showing a grounding operation of the grounding device of the present invention.

When the electron tube 10 is coupled with the chassis frame 20 as shown in FIG. 7, the band 11 of the electron tube 10 is inserted into the chassis frame 20, pressing the intermediate bent portion 43 of the earth plate 40 so that the intermediate bent portion 43 is pushed towards the outside of the chassis frame 20, and that the free end portion 44 is pushed within the guiding groove 23a of the retainer 23. Here, if the band 11 of the electron tube 10 pushes the intermediate bent portion 43 of the earth plate 40, the free end portion 44 is in a state of being ready to outwardly deviate within the guiding groove 23a. However, the retainer 23 restrains the free end portion 44 from deviating so that the intermediate bent portion 43 of the earth plate 40 strongly and accurately contacts with the band 11 of the earth plate 40.

The free end portion 44 of the earth plate 40 passes through the penetration aperture 22 of the chassis frame 20 and comes out of the chassis frame 20 so that it does not become an obstacle when the electron tube 10 is inserted into the chassis frame 20. The free end portion 44 which is pushed as the intermediate bent portion 43 of the earth plate 40 is pressed during such an assembling, is inserted into the retainer 23 outside the chassis frame 20 so that a degauss coil 30 which is fixed at a bent piece 27 formed inside the chassis frame 20, does not contact with the sharp portion of the free end portion 44, and that then, the coating of the degauss coil 30 is not torn, thereby removing the cause of poor products.

Figure 4:
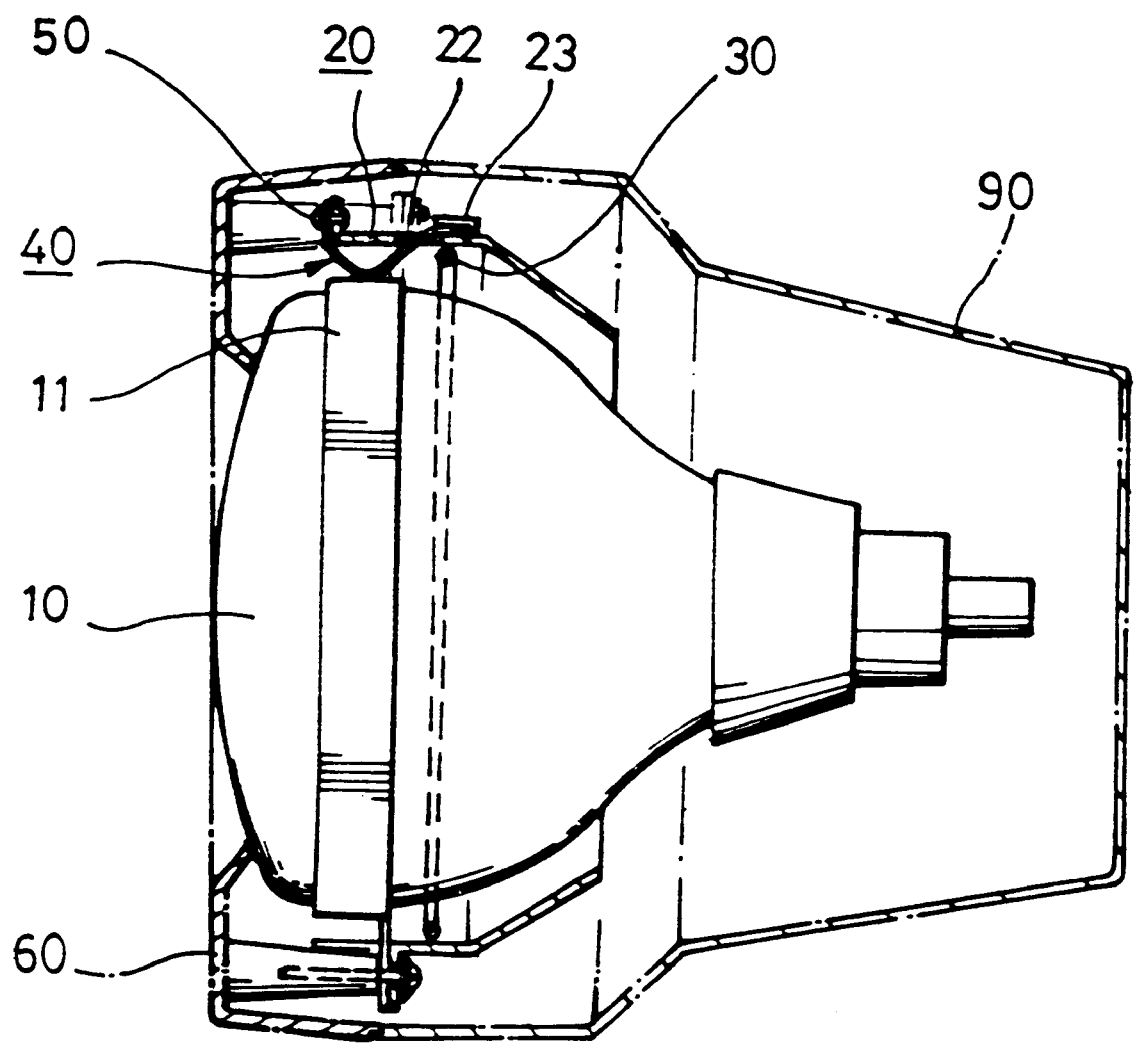
FIG. 4 illustrates a plane-sectional view of an image display unit constructed according to the principles of the present invention, to which a grounding device of the present invention is applied.

Referring to FIG. 4, a first cover 60 and a second cover 90 usually cover the electron tube 10 and the chassis frame 20 which are coupled with each other in such a way. This completes an image display unit. As mentioned above, the free end portion of the earth plate which is installed at the chassis frame, is constrained outside the chassis frame so that the deformation of the earth plate is prevented during treating and assembling process, and that then, the earth plate accurately contacts with the band of the electron tube in case of assembling with the electron tube.

The sharp portion of the earth plate does not contact with the degauss coil so that the degauss coil is not damaged, thereby preventing the deterioration of the products' quality. Also the deformation of the earth plate is prevented during treating and assembling process so that the assembling process can be easily made without much attention, thereby enhancing the productivity.

It will be apparent to those skilled in the art that various modifications and variations can be made in an electron tube grounding device of an image display unit of the present invention without departing from the spirit or scope of the invention. Thus, it is intended that the present invention cover the modifications and variations of this invention provided they come within the scope of the appended claims and their equivalents.

What is claimed is:

1. An earth plate of a electron tube grounding device of an image display unit, the earth plate grounding an electronic tube and a chassis frame surrounding the electron tube, the earth plate comprising:

a fixed portion to be attached to the chassis frame, the chassis frame having a penetration aperture located on a first side of the chassis frame, and rail means protruding from the chassis frame, the rail means located on a second side, opposite of the first side, of the chassis frame; and an intermediate portion elastically contacting with a band of the electron tube during and assembly with the electron tube; and a free end portion to be attached to the chassis frame by being inserted through the penetration aperture of the chassis frame and inserted into the rail means.

2. The device as claimed in claim 1, wherein the rail means of the chassis frame comprises a retainer having a guiding groove protruding from the chassis frame, the guiding groove guiding the free end portion of the earth plate through the penetration aperture.

3. The device as claimed in claim 2, wherein the retainer is formed integrally with the chassis frame by punching the chassis frame to create a punched aperture, and a deviation preventing piece for preventing deviation of the chassis frame is placed at a punched aperture.

4. The device as claimed in claim 2, wherein locating holes of the earth plate are formed on both sides of a coupling hole of the earth plate for securing the fixed end portion of the earth plate, and locating projections of the chassis frame at a front of the chassis frame are inserted into the locating holes, the locating projections of the chassis frame securing the earth plate from moving up and down.

5. The device as claimed in claim 1, wherein a retainer is formed integrally with the chassis frame by punching the chassis frame to create a punched aperture, and a deviation preventing piece for preventing deviation of the chassis frame is placed at a punched aperture.

6. The device as claimed in claim 5, wherein locating holes of the earth plate are formed on both sides of a coupling hole of the earth plate for securing the fixed end portion of the earth plate, and locating projections of the chassis frame at a front of the chassis frame are inserted into the locating holes, the locating projections of the chassis frame securing the earth plate from moving up and down.

7. The device as claimed in claim 1, wherein locating holes of the earth plate are formed on both sides of a coupling hole of the earth plate for securing the fixed end portion of the earth plate, and locating projections of the chassis frame at a front of the chassis frame are inserted into the locating holes, the locating projections of the chassis frame securing the earth plate from moving up and down.

8. An electron tube grounding device on an image display unit comprising;

an electron tube;

a chassis frame surrounding the electron tube, the chassis frame having a penetration aperture located on a first side of the chassis frame, and a rail means protruding from the chassis frame, the rail means located on the second side, opposite of the first side, of the chassis frame; and an earth plate grounding the chassis frame and the electron tube, the earth plate to be attached to the chassis frame by being inserted into the penetration aperture, the earth plate having a fixed end portion to be attached to a third side of the chassis frame, an intermediate portion elastically contacting with a band of the electron tube during an assembly with the electron tube and a free end portion inserted through the penetration aperture and into the rail means.

9. The device as claimed in claim 8, wherein the rail means of the chassis frame comprises a retainer having a guiding groove protruding from the chassis frame, the guiding groove guiding the free end portion of the earth plate through the penetration aperture.

10. The device as claimed in claim 9, wherein locating holes of the earth plate are formed on both sides of a coupling hole of the earth plate for securing the fixed end portion of the earth plate, and locating projections of the chassis frame at a front of the chassis frame are inserted into the locating holes, the locating projections of the chassis frame securing the earth plate from moving up and down.

11. The device as claimed in claim 8, wherein a retainer is formed integrally with the chassis frame by punching the chassis frame to create a punched aperture, and a deviation preventing piece for preventing deviation of the chassis frame is placed at a punched aperture.

12. The device as claimed in claim 11, wherein the retainer is formed integral with the chassis frame by punching the chassis frame to create a punched aperture, and a deviation preventing piece for preventing deviation of the chassis frame is placed at a punched aperture.

13. The device as claimed in claim 11, wherein locating holes of the earth plate are formed on both sides of a coupling hole of the earth plate for securing the fixed end portion of the earth plate, and locating projections of the chassis frame at a front of the chassis frame are inserted into the locating holes, the locating projections of the chassis frame securing the earth plate from moving up and down.

14. The device as claimed in claim 8, wherein locating holes of the earth plate are formed on both sides of a coupling hole of the earth plate for securing the fixed end portion of the earth plate, and locating projections of the chassis frame at a front of the chassis frame are inserted into the locating holes, the locating projections of the chassis frame securing the earth plate from moving up and down.

15. An image display unit comprising:

an electron tube; and a chassis frame for surrounding the electron tube, a fixed end portion of a earth plate being attached to a front of the chassis frame by using a coupling member, and an end of a intermediate bent portion, bent from the fixed end portion of the earth plate, being passed through a penetration aperture inside of the chassis frame and being inserted into a guiding groove of a retainer integrally protruding from outside of the chassis frame, the intermediate bent portion of the earth plate contacting with a band of the electron tube during an assembling process.

* * * * *